2 Sheets—Sheet 1.
T. I. WADE.
Plow.
No. 201,576.    Patented March 19, 1878.
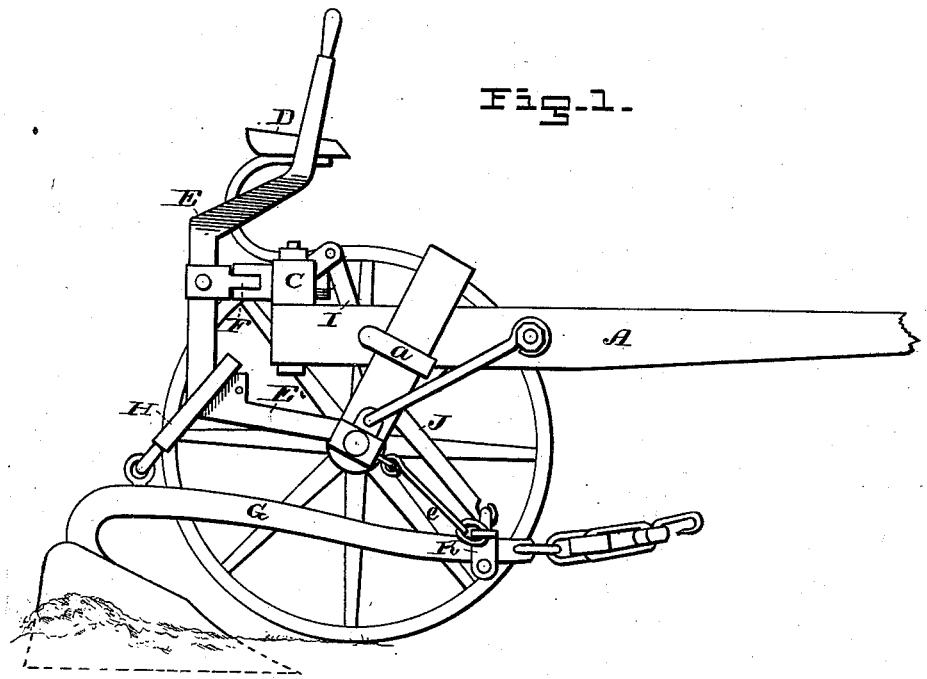
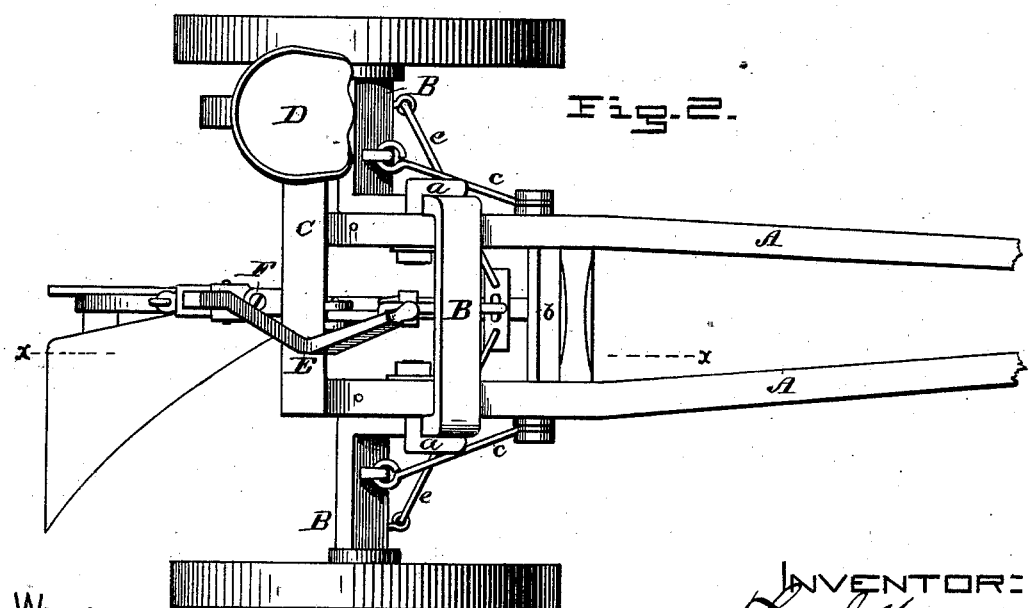

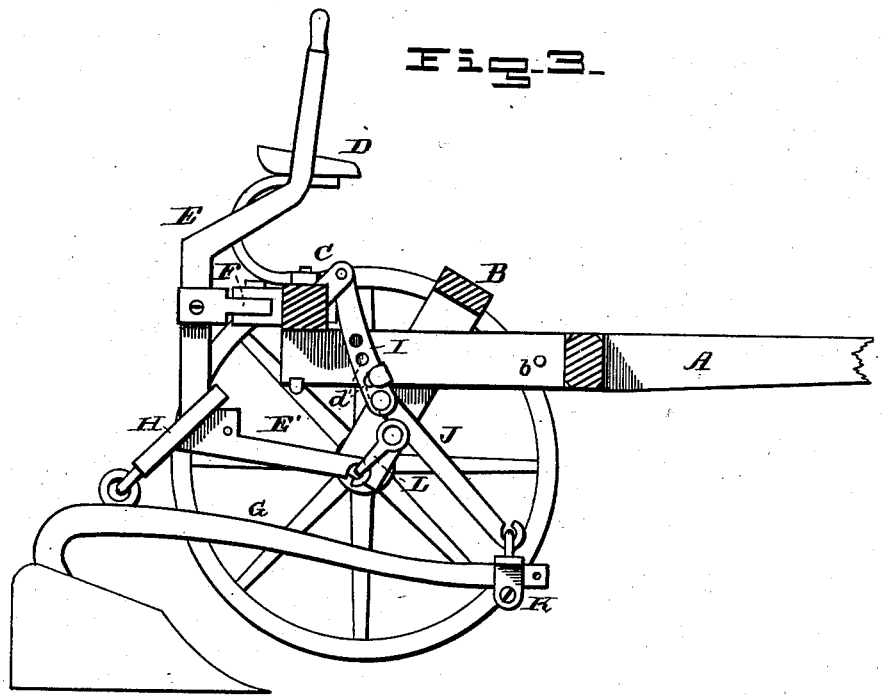

UNITED STATES PATENT OFFICE.

THOMAS I. WADE, OF STILSON, KANSAS, ASSIGNOR OF ONE-HALF HIS RIGHT TO THEODORE A. McCORMICK.

IMPROVEMENT IN PLOWS.

Specification forming part of Letters Patent No. 201,576, dated March 19, 1878; application filed August 24, 1877.

*To all whom it may concern:*

Be it known that I, THOS. I. WADE, of Stilson, in the county of Cherokee and State of Kansas, have invented certain new and useful Improvements in Plows; and I do hereby declare that the following is a full, clear, and exact description thereof, which will enable others skilled in the art to which it appertains to make and use the same.

This invention relates to certain improvements in plows; and consists in the means of attaching a plow-beam to a vehicle of suitable construction; also, setting the plow to make any required depth of furrow; also, throwing it to one side, to pass around a stump or other obstruction, and elevating it so as to ride free of the ground, as will be hereinafter more fully set forth.

In order to enable others skilled in the art to which my invention appertains to make, construct, and use the same, I will now proceed to describe its construction, arrangement, and operation, reference being had to the accompanying drawings, which form a part of this specification, and in which—

Figure 1 is a side view with one of the wheels removed. Fig. 2 is a top view, and Fig. 3 is a section on line *x x* of Fig. 2.

A represents the tongue, secured to the axle B by ordinary shackles *a*. Through the tongue passes a bolt, *b*, having at each end connected a rod, *c*, which extends to, and is secured to, the axle B.

On the tongue is adjustably arranged a cross-piece, C, having one end provided with a seat, D. The lever E is secured to the cross-piece C by a swivel, F, forming a universal joint, so as to allow of the desired movement of the lever. This lever has the upper end crooked, and the lower end E' bent at right angles, as shown in Fig. 1.

The back end of the beam G is, by a link, H, connected to the lever E, thereby supporting and allowing it free movement.

Hinged to the cross-piece C is a perforated arm, I. To the lower end of arm I is adjustably secured an arm, J, having the upper end bent around the arm I, as shown. The lower end of arm J is connected to a slide, K, adjustably arranged on the beam G. This slide is held in position on the beam by rods *e*, extending from the axle.

The lower end E' of the lever E is connected with a stirrup, L, pivoted to the arm J. By this means the front of beam G is always carried at the desired distance from the ground, and, by reason of the backward strain of the plow, the arms I and J will brace and hold the beam down, thereby preventing the front of beam G from being elevated, and the cut of the plow being changed by the draft of the horses.

To cut a furrow of any desired depth, the cross-piece C is moved toward the axle B, and the arm J adjusted upon the arm I by means of a bolt passed through the holes *d* and the head of the arm J, thereby giving both ends of the beam G the same adjustment.

When the plow is to be carried free of the ground, the lever E is pulled over near the seat D; and to guide the plow around a stump or other obstruction, the lever is pulled just far enough to throw the plow to one side and not remove it from the ground.

Having thus fully described my invention, what I claim as new, and desire to secure by Letters Patent, is—

1. In combination with the plow-carriage hereinbefore described, the lever E, link H, arms I J, and slide K, all arranged to carry the plow and hold it in position when plowing, substantially as described.

2. The combination of the cross-piece C, adjustably arranged on the tongue A, and arms I J, adjustably connected together, with lever E, link H, and slide K, as and for the purpose set forth.

In testimony that I claim the foregoing as my own I affix my signature in presence of two witnesses.

THOMAS I. WADE.

Witnesses:
 HENRY ADAIR,
 EVAN J. HARRIS.